United States Patent [19]

Langer, Jr. et al.

[11] 4,224,182

[45] Sep. 23, 1980

[54] NOVEL HINDERED ALKYL ALUMINUM AMIDE COCATALYSTS

[75] Inventors: Arthur W. Langer, Jr., Watchung; John J. Steger, Scotch Plains; Terry J. Burkhardt, Cranford, all of N.J.

[73] Assignee: Exxon Research & Engineering Co., Florham Park, N.J.

[21] Appl. No.: 18,188

[22] Filed: Mar. 7, 1979

[51] Int. Cl.$^2$ ............................................... C08F 4/64
[52] U.S. Cl. ........................... 252/429 B; 252/429 C; 252/43 N; 526/139; 526/140; 526/141; 526/142; 526/163
[58] Field of Search ............ 252/429 B, 429 C, 431 N

[56] References Cited

U.S. PATENT DOCUMENTS

| | | | |
|---|---|---|---|
| 3,489,736 | 1/1970 | Takahashi et al. | 252/429 C X |
| 3,723,348 | 3/1973 | Apotheker et al. | 252/431 N X |
| 4,094,818 | 6/1978 | Langer | 252/429 C |

*Primary Examiner*—Patrick Garvin
*Attorney, Agent, or Firm*—Richard E. Nanfeldt

[57] ABSTRACT

A new catalyst system for alphaolefin type polymerizations, includes at least one hindered alkyl metal amide compound having the formula $R'_2YNR_2$ in combination with a Group IVB-VIII transition metal compound on a support and at least one Lewis base wherein R is selected from the group consisting of $C_4$ to $C_{20}$ bulky alkyl, cycloalkyl, aralkyl, aryl and substituted aryl groups or $R_2N$ is a hindered cyclic amide group; R' is selected from the group consisting of $C_1$ to $C_{20}$ primary alkyl, secondary alkyl, tertiary alkyl, neopentyl alkyl, branched alkyl, cycloalkyl or aralkyl groups, and Y is selected from the group consisting of aluminum, gallium or indium. The catalyst system provides polymers having increased isotactic stereoregularity as well as lower catalyst residue.

20 Claims, No Drawings

NOVEL HINDERED ALKYL ALUMINUM AMIDE COCATALYSTS

BACKGROUND OF THE INVENTION

1. Field of the Invention

A new Ziegler type catalyst system for alpha olefin type polymerization includes at least one supported Group IVB-VIII transition metal halide, a highly hindered amide having the formula $R'_2YNR_2$ and at least one Lewis base, wherein $R'$ is selected from the group consisting of $C_1$ to $C_{20}$ primary alkyl, secondary alkyl, tertiary alkyl, neopentyl alkyl, branched alkyl, naphthenic, or aralkyl groups, R is selected from the group consisting of aryl groups, substituted aryl groups, $C_3$ to $C_{20}$ bulky alkyl, cycloalkyl, aralkyl, aryl or substituted aryl groups or $R_2N$ is a cyclic amide group and Y is selected from the group consisting of aluminum, gallium or indium. The catalyst system provides high polymerization activity and increased crystallinity of the polymer.

2. Description of the Prior Art

There is extensive art on the polymerization of ethylene and higher alpha-olefins, including dienes, using Ziegler-type catalysts containing either alkyl metals or alkyl metals in which an alkyl group has been replaced by X, OR, SR, $NR_2$, etc., in combination with a transition metal compound of Groups IVB-VIII, where X=halide and R=$C_1$ to $C_{20}$ hydrocarbyl substituent.

For commercial stereospecific polymerization of propylene and higher alpha olefins, only a few alkyl metal compounds have been found effective in combination with titanium or vanadium chlorides. Commercially, only $R_2AlCl$ or $R_3Al$ are used together with a crystalline form of $TiCl_3$ or $TiCl_3 \cdot nAlCl_3$. Mixtures of $R_3Al$ and $R_2AlCl$ and $RAlCl_2$ are made in situ and have been disclosed as catalyst components frequently in the art. R is preferably ethyl (Et) or isobutyl; n=0.1 to 0.75.

It is also well-known that, in propylene polymerizations using $TiCl_3$, catalyst activity decreases sharply in the series $AlEt_3$, $Et_2AlCl$, $EtAlCl_2$ (Malatesta, Can. J. Chem. 37, 1176 (1959) and Boldyreva et al, Vysokomolekul. Soedin 1, 900 (1959); C.A. 55, 2454a (1961). When the chloride in $Et_2AlCl$ is replaced by OR, SR, SeR or $NR_2$, activity and polymer isotacticity usually drop drastically (Danusso, J. Polymer Sci. C4, 1497 (1964)).

In one of the present inventor's research, $Et_2AlOEt$ and $Et_2AlNEt_2$ were found to have some activity with $TiCl_3$, but the polypropylene obtained was nearly atactic (Langer, Seventh Biennial Polymer Symposium, Florida, Dec. 8, 1974). Therefore, the art teaches that both activity and polymer isotacticity are extremely low when $R_2AlNR_2$ (aluminum amide) compounds are used as replacements for conventional alkyl metal cocatalyst components.

U.S. Pat. No. 3,418,304 discloses a complex of alkyl metal compounds such as $Et_2AlNEt_2$ and Lewis acid salts such as $AlCl_3$ and $MgCl_2$, e.g., $Et_2AlNEt_2 \cdot AlCl_3$ as cocatalysts to entirely replace conventional aluminum alkyls, but such complexes are entirely different from the concept of utilizing certain hindered aryl amides and Lewis bases as cocatalysts for supported $TiCl_3$ or $TiCl_4$.

U.S. Pat. No. 3,255,169 discloses a Ziegler catalyst system employing aluminum hydroaminate compounds. Typical of these is $HAl(NHC_2H_5)_2$ which is unrelated to the dialkyl aluminum hindered amides of this invention.

Recently, U.S. Pat. No. 3,905,913 has issued disclosing the use of

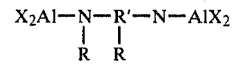

where X is H or halogen, both Rs are hydrocarbon radicals; and R' is a divalent hydrocarbon radical. These compounds are not closely related to those of the invention herein, and they would be inactive in this invention.

SUMMARY OF THE INVENTION

The present instant invention relates to unique and novel Ziegler type catalyst systems for the conventional alpha-olefin type polymerizations thereby yielding polymers having a high degree of isotactic stereoregularity.

The present invention provides supported Ziegler type catalyst systems which produce both high polymerization activity and high polymer crystallinity, e.g., isotacticity, wherein the catalyst system includes at least one supported Group IVB-VIII transition metal halide, and a highly hindered alkyl metal amide compound having the formula $R'_2YNR_2$ and at least one Lewis base, wherein $R'$ is selected from the group consisting of $C_1$ to $C_{20}$ primary alkyl, secondary alkyl, tertiary alkyl, neopentyl alkyl, branched alkyl, naphthenic or aralkyl groups, R is selected from the group consisting of $C_4$ to $C_{20}$ bulky alkyl, cycloalkyl, aralkyl, aryl or substituted aryl groups or $R_2N$ is a cyclic amide group, and Y is selected from the group consisting of aluminum, gallium and indium. These co-catalysts yield higher activity and/or isospecificity than the conventional tri-alkyl metal compounds when used in combination with the various types of supported transition metal catalysts, such as $MgCl_2$-supported $TiCl_4$, supported $TiCl_3$, etc., with or without other catalyst modifiers present, such as Lewis bases, alcohols, phenols, polymers, dispersants, binders and other additives.

The present invention provides a process for alpha-olefin type polymerizations, wherein the polymerization activity is increased and the formed polymer has a high degree of isotactic stereoregularity and a minimum amount of catalyst residues.

In the instant invention the isotacticity of the formed polymer is much less sensitive to the cocatalyst concentration or the ratio of cocatalyst to transition metal compound than when conventional Group IIIA trialkyl metal compounds are used, thereby greatly facilitating process control.

The instant compounds can be used directly with various types of supported transition metal halides without substantial modification of the commercial catalyst preparation or the polymerization plant.

GENERAL DESCRIPTION

It is well-known in the art to use an alkyl metal compound of Groups I-III in combination with a transition metal compound of Groups IVB-VIII as a catalyst system for olefinic polymerization. While nearly all of the alkyl metal compounds are effective for the polymerization of ethylene, only a few are effective for the preparation of isotactic polymers of propylene and higher alpha olefins and only $Et_2AlCl$, $AlEt_3$ and i-$Bu_2AlH$ have any important commercial utility.

Diethyl aluminum chloride is used commercially as the cocatalyst of choice for TiCl₃ to make isotactic polypropylene. However, dialkyl aluminum chlorides, alkoxides, amides, etc., have very low activity and produce polypropylene of low stereospecificity as measured by the percent insoluble in boiling heptane (% HI) when used in combination with supported titanium tetra-chloride catalysts. It was surprising, therefore, to discover that certain types of highly hindered dialkyl aluminum amides were nearly as active as the trialkyl aluminum cocatalysts which had been preferred for use with supported catalysts. At the same time, these novel hindered amide cocatalysts gave remarkably high stereospecificity when used alone and especially when used in combination with hindered Lewis bases.

A major cost involved in the polymerization of the alpha olefins is the cost of the catalyst components. Therefore, the cost of the manufacture of the polymer can be effectively reduced by the use of catalyst systems having a higher polymerization activity. A further concern is the ability to produce polymers having a minimum amount of catalysts residues thereby eliminating a costly deashing operation. A still further concern is the ability to produce polymers having a high degree of isotactic stereoregularity thereby enabling the manufacturer to eliminate or reduce the costly operation involving the removal and separation of atactic polymer from the isotactic polymer. The catalyst system of the present instant invention provides a means to the manufacturer of obtaining these desirable realizations.

The catalyst systems of the present invention which are employed in alpha olefin polymerizations include a Group IVB-VIII transition metal compound on a support, one or more Lewis bases, and at least one highly hindered alkyl metal amide compound, wherein the amide group is hindered by steric and/or electronic effects which decrease the tendency to form nitrogen-bridged dimers.

The transition metal catalyst compound is a Group IVB-VIII transition metal halide, whereby the halide group is chloride or bromide and the transition metal halide is in the form of solid crystalline compounds, solid solutions or compositions with other metal salts or supported on the surface of a wide range of solid supports. For highest stereospecificity it is desirable to have the transition metal halide or its support composition, in the layer lattice structure with very small crystallites, high surface area, or sufficient defects or foreign components to facilitate high dispersion during polymerization. The transition metal halide may also contain various additives such as Lewis bases, pi bases, polymers or organic or inorganic modifiers. Vanadium and titanium halides such as $VCl_3$, $VBr_3$, $TiCl_3$, $TiCl_4$, $TiBr_3$ or $TiBr_4$ are preferred, most preferably $TiCl_3$ or $TiCl_4$ and mixtures thereof. The most preferred $TiCl_3$ compounds are those which contain $TiCl_4$ edge sites on a layer lattice support such as alpha, delta, or gamma $TiCl_3$ or various structures and modifications of $TiCl_3$, $MgCl_2$ or other inorganic compounds having similar layer lattice structures. The most preferred $TiCl_4$ compounds are those supported on chloride layer lattice compounds such as $MgCl_2$. Other anions may be also present, such as other halides, pseudo-halides, alkoxides, hydroxides, oxides or carboxylates, etc., providing that sufficient chloride is available for isospecific site formation. Mixed salts or double salts such as $K_2TiCl_6$ or $MgTiCl_6$ can be employed alone or in combination with electron donor compounds. Other supports besides $MgCl_2$ which are useful are hydroxychlorides, oxides or other inorganic or organic supports. The most preferred transition metal compound is $TiCl_4$ containing $MgCl_2$ especially in the presence of Lewis bases (electron donor compounds).

The hindered amide cocatalysts of this invention have the general structure $R'_2AlNR_2$, wherein $R'=C_1$ to $C_{20}$ hydrocarbyl group such as primary alkyl, secondary alkyl, tertiary alkyl, neopentyl alkyl, branched alkyl, cycloalkyl or aralkyl, preferably a $C_{1-12}$ alkyl; and $R=C_4$ to $C_{20}$ bulky alkyl, cycloalkyl, aralkyl, aryl or substituted aryl groups including ring structures such as $R_2Al$ piperidide and $Et_2Al$ pyrrolidide containing alpha substituents. Hindered amide groups are derived from hindered secondary amines described below. Such compounds have large, bulky R groups by virtue of branching on the carbons alpha, beta or gamma to the nitrogen. Illustrative examples of R groups include, isobutyl, neopentyl, 3,3-diethylhexyl, 2-ethylhexyl, 2-butyl, 2-octyl, 3-pentyl, t-butyl, t-pentyl, cyclohexyl, cyclopentyl, 2-methyl-cyclopentyl, 3-ethylcyclohexyl, phenyl, tolyl, xylyl, higher alkyl phenyl groups, chlorophenyl, methoxyphenyl, naphthyl and mixtures including mixtures in which one R group may be a less bulky saturated group when the other group is a bulky aryl group. Also, the two R groups may be part of a cyclic amide structure, such as pyrrolidide, piperidide, and the like and their various alkyl substituted derivatives especially when the substituents are on the carbon atoms adjacent to the nitrogen atoms, such as 2,6-di-isopropyl piperidide, 2,2,6,6-tetramethylpiperidide, and the like.

The highly hindered amides of this invention require greater hindrance than that of $Et_2AlNiPr_2$ or $Et_2AlN(cyC_6H_{11})_2$ which are known in the art to be sufficiently hindered to favor mixed dimer formation with $RAlCl_2$. Such amides, however, are quite inactive when used alone as cocatalyst for supported $TiCl_4$ catalysts. Examples of suitable sterically hindered amides of dialkyl aluminum include 2,2,6,6-tetramethylpiperidide, 2,6-di-isopropylpiperidide; 2,2,5,5-tetramethylpyrrolidide, 2,2,6-trimethylpiperidide, 2,6-di-isopropylpyrrolidide, di-tert-butylamide, t-butylisopropylamide, di(2-methylcyclohexyl)amide, and the like, with the tetramethylpiperidide and pyrrolidide being most preferred. Examples of electronically and sterically hindered dialkyl aluminum amides include diphenylamide, di-ortho-tolylamide, di-meta-tolylamide, di-2,4-dimethylphenylamide, di-t-butylphenylamide, di-p-chlorophenylamide, di-p-methoxyphenylamide, phenyl t-butylamide, ortho-tolyl isopropyl amide, phenyl p-phenylaminophenylamide, phenyl 1-naphthyl amide, phenyl 2-naphthylamide, and the like, with the diphenylamide and di-tolylamides being preferred, and the di-tolylamides being most preferred.

The alkyl groups on the alkyl metal amide compound containing about 2 to 12 carbons per alkyl group all produce higher activity catalysts. However, for propylene and higher alphaolefins, $C_2$ to $C_4$ alkyl groups are preferred.

The Y group of $R'_2YNR_2$ is selected from the group consisting of aluminum, gallium, or indium, most preferably aluminum.

Lewis bases can be employed in combination with the dialkyl metal amide compound or with the Group IVB to VIII transition metal compound or with both components as long as they do not cause excessive cleavage of metal-carbon bonds or loss of active sites. A wide variety of Lewis bases may be used including such types as tertiary amines, esters, phosphines, phosphine oxides, phosphates (alkyl, aryl), phosphites, hexaalkyl phosphoric triamides, dimethyl sulfoxide, dimethyl formamide, secondary amines, ethers, epoxides, ketones, saturated and unsaturated heterocycles, or cyclic ethers and mixtures thereof. Typical but nonlimiting examples are di-ethyl ether, dibutyl ether, tetrahydrofuran, ethylacetate, methyl p-toluate, ethyl p-anisate, ethyl benzoate, phenyl acetate, amyl acetate, methyl octanoate, acetophenone, benzophenone, triethylamine, tributyl amine, dimethyldecylamine, pyridine, N-methylpiperidine, 2,2,6,6-tetramethylpiperidine, and the like. Especially useful in combination with the dialkyl metal amide cocatalyst are Lewis bases, whose complexing ability toward the cocatalyst is hindered sufficiently by steric and/or electronic effects to cause appreciable dissociation of the dialkyl metal amide--Lewis base complex under polymerization conditions. Although a wide range of mole ratios may be used, dissociation of the complex as measured on a 1:1 complex is normally in the range of 1-99 mole %, more preferably 5-95%, and most preferably greater than about 10% and less than about 90%. Steric hindrance is achieved by bulky substituents around the heteroatom which reduces the accessibility of the base functionality to the Lewis acid, that is, the alkyl metal compound. Electronic hindering is obtained by placing electron withdrawing substituents on the heteroatom to reduce the electron density on the basic heteroatom. Aromatic substituents are especially useful because they are relatively unreactive toward other catalyst components. Hindered Lewis bases derived from piperidines, pyrrolidines, ketones, tetrahydrofuranes, secondary and tertiary aromatic amines and tertiary aliphatic amines are preferred with the hindered nitrogen bases being most preferred.

Nonlimiting examples of sterically hindered bases include 2,2,6,6-tetramethylpiperidine, 2,2,5,5-tetramethylpyrrolidine, 2,2,5,5-tetramethyltetrahydrofuran, di-tert-butylketone, 2,6-diisopropylpiperidine, ortho-tolyl t-butyl ketone, methyl 2,6-di-tert-butylphenylketone, diisopropylethylamine, diisopropylmethylamine, t-butyldimethylamine, 6-methyl-2-isopropyl pyridine, di-t-butylamine, and the like. Electronically hindered Lewis bases include diphenylamine, di-ortho-tolylamine, N,N-dimethylaniline,di-ortho-tolylketone, and the like. Since aromatic substituents are also bulky, some of the electronically hindered bases can also have a steric contribution to the hindrance; for example, t-butylaniline, ortho-tolylisopropylamine, and the like. Especially preferred hindered amines are 2,2,6,6-tetramethylpiperidine, 2,2,5,5-tetramethylpyrrolidine and the diarylamines. Completely hindered bases, such as 2,6-di-tertiarylbutylpyridine, and the like, which complex the alkyl metal cocatalyst too weakly are ineffective for improving stereospecificity and are excluded from this invention.

Further increases in activity or stereospecificity may be obtained by premixing the transition metal component with either the amide or the hindered Lewis base or both.

The amide cocatalysts are effective with all the usual polymerization conditions. Thus solvent, temperature and monomer concentrations are not critical. Increased activity is obtained with all alpha olefins from propylene to $C_{10}$ and higher as well as in copolymerizations such as ethylene/$\alpha$-olefin, ethylene/diolefin, propylene/$\alpha$-olefin, propylene/diolefin and ethylene/$\alpha$-olefin/diene copolymerizations. The amount of alkyl metal amide cocatalyst is usually in the range of 1:1 to 200:1, or higher, preferably about 5:1 to 100:1 mole ratio of alkyl metal amide to transition metal compound. While unhindered Lewis bases must be used in less than equimolar amounts based on the alkyl metal amide cocatalyst, the hindered Lewis bases may be added over a much wider range from about 0.1 to 1 to over 10 to 1 mole ratio of base to alkyl metal amide to obtain higher stereospecificity without a major loss of activity which would occur with unhindered bases.

For the alkyl metal cocatalysts of this invention, the most preferred transition metal compounds contain $TiCl_4$ supported on $MgCl_2$ and one or more Lewis bases. The concentration of the transition metal in the polymerization zone is about 0.001 to about 5 mM, preferably less than about 0.1 mM.

The catalyst system of the invention enables the process for making alpha olefin polymers having a high degree of isotactic stereoregularity to be carried out at a temperature of about 25° to about 150° C., more preferably about 40° to about 80° C., at pressures of about 1 atm. to about 50 atm. The reaction time for polymerization is about 0.1 to about 10 hours, more preferably about 0.5 to about 3 hours. Due to the high catalyst activity, shorter times and temperatures below 80° C. can be readily employed.

The reaction solvent for the system can be any inert paraffinic, naphthenic or aromatic hydrocarbon such as benzene, toluene, xylene, propane, butane, pentane, hexane, heptane, cyclohexane, and mixtures thereof. Preferably excess liquid monomer is used as solvent. Gas phase polymerization may also be carried out with or without minor amounts of solvent.

Typical, but nonlimiting examples of $C_2$–$C_{20}$ alpha olefinic monomers employed in the present invention for the manufacture of homo-, co- and terpolymers are ethylene, propylene, butene-1, pentene-1, hexene-1, octadecene-1, 3-methylbutene-1, styrene, ethylidenenorbornene, 1,5-hexadiene and the like and mixtures thereof. Isotactic polymerization of propylene and higher olefins is especially preferred, including block copolymerizations with ethylene.

DETAILED DESCRIPTION OF THE PREFERRED EMBODIMENTS

The advantages of the unique and novel catalysts system, the process for the alpha olefin polymerization and the unique and novel compositions of the present instant invention can be more readily appreciated by reference to the following examples and tables.

EXAMPLE 1

Polymerization runs were carried out in a 1 liter baffled resin flask fitted with an efficient reflux condenser and a high speed stirrer. In a standard procedure for propylene polymerizations, 480 ml n-heptane (<1 ppm water) containing the cocatalyst was charged to the reactor under dry $N_2$, heated to reaction temperature (65° C.) and saturated with pure propylene at 765 mm pressure. The supported catalyst (0.2 g) was charged to a catalyst tube containing a stopcock and a rubber septum cap. Polymerization started when the catalyst was rinsed into the reactor with 20 ml n-heptane from a syringe. Propylene feed rate was adjusted to an exit gas rate of 200–500 cc/min. at a pressure of 765 mm. After one hour at temperature and pressure, the reactor slurry was poured into one liter isopropyl alcohol, stirred 1–4 hours, filtered, washed with alcohol and vacuum dried.

Stereospecificity was determined by the percent boiling n-heptane insoluble (% HI) polymer on total product including alcohol-solubles minus catalyst.

A supported catalyst was prepared by ball milling 5 MgCl$_2$, 1 TiCl$_4$ and 1 ethylbenzoate (EB) for four days, treating the product with liquid TiCl$_4$ at 80° C., four hours, washing and vacuum drying at 50° C. The catalyst contained 3.38% titanium.

The results in Table I, Runs D-G, show that the hindered diarylamides and the tetramethylpiperidide gave polymerization rates much higher than diethyl aluminum chloride (Control Run A) and nearly as high as aluminum triethyl (Control Runs B and C). The % HI was remarkably high compared to the controls.

Comparison of Runs F and G with Control Runs B and C shows that the hindered amides of this invention give the opposite results to those of AlEt$_3$ as a function of Al/Ti ratio. Increasing the ratio from 7.1 (Run F) to 70.9 (Run G) increased activity while maintaining constant high % HI. With AlEt$_3$, merely doubling the Al/Ti ratio caused a decrease in activity and a major decrease in % HI. Thus, the dialkyl aluminum amides of this invention also greatly improve process control compared to conventional cocatalysts.

TABLE I

| Run | mmoles Cocatalyst | g/g Cat/Hr. | % HI |
|---|---|---|---|
| Control A | 2 Et$_2$AlCl | 79 | 72.5 |
| Control B | 1 AlEt$_3$ | 481 | 81.8 |
| Control C | 2 AlEt$_3$ | 419 | 66.0 |
| D | 2 Et$_2$AlNφ$_2$ | 308 | 94.8 |
| E | 2 Et$_2$AlN(o-tolyl)$_2$ | 324 | 95.0 |
| F | 1 Et$_2$Al-2,2,6,6-TM pip (a) | 74 | 98.8 |
| G(b) | 5 Et$_2$Al-2,2,6,6-TM pip (a) | 223 | 99.1 |

(a) Diethyl aluminum-2,2,6,6-tetramethylpiperidide.
(b) 0.1 g. catalyst was used.

EXAMPLE 2

The procedure of Example 1 was followed except that another preparation of catalyst was used which contained 3.16% titanium. Insufficiently hindered diethyl aluminum amides are shown as controls.

TABLE II

| Run | mmoles Cocatalyst | g/g Cat/Hr. | % HI |
|---|---|---|---|
| Control H | Et$_2$AlN(cy-C$_6$H$_{11}$)$_2$ | <1 | — |
| Control I | 2 Et$_2$Al-2,6-Dimethylpiperidide | <1 | — |
| J | 2 Et$_2$AlNφ$_2$ | 335 | 95.7 |

The control runs show that amides whose nitrogen-bridging capabilities are not sufficiently weakened by steric and/or electronic effects are almost completely inactive, whereas the diarylamide (electronically weakened) gave both very high activity and % HI.

EXAMPLE 3

The procedure of Example 1 was followed except that various bases were also added to the reactor together with 2 mmoles Et$_2$AlNφ$_2$ cocatalyst.

TABLE III

| Run | mmoles Base | g/g Cat/Hr. | % HI |
|---|---|---|---|
| K | None | 308 | 94.8 |
| L | 0.2 Ethylbenzoate | 153 | 97.7 |
| M | 0.5 2,2,6,6-tetramethylpiperidine | 315 | 98.3 |
| N | 2 2,2,6,6-tetramethylpiperidine | 242 | 98.4 |
| O | 0.5 Et$_2$AlNi-Pr$_2$ | 270 | 93.6 |

The hindered tetramethylpiperidine was much more effective in improving % HI without loss of activity than an unhindered base (ethylbenzoate) (Runs M and N vs. K and L). Addition of an unhindered amide (Run O) gave lower activity and HI, confirming the results in Example 2, which also show that the conventional, unhindered amides are undesirable.

EXAMPLE 4

The procedure of Example 1 was followed except that polymerization was carried out in a pressure reactor containing 500 ml liquid propylene in the absence of added diluent at 65° C., 30 minutes. Using 1 mmole Et$_2$Al-2,2,6,6-tetramethylpiperidide and 0.02 g. catalyst, the catalyst efficiency was 7000 g. polypropylene/g. catalyst and the % HI was 95. The 30 minute catalyst efficiency based on titanium content was 207,000 g. polymer/g. Ti.

What is claimed is:
1. A catalyst composition which comprises:
    (a) a supported Group IVB-VIII transition metal halide;
    (b) an alkyl metal amide compound having the formula R'$_2$YNR$_2$ wherein R' is selected from the group consisting of C$_1$ to C$_{20}$ primary alkyl, secondary alkyl, tertiary alkyl, neopentyl alkyl, branched alkyl, naphthenic and aralkyl groups, R is selected from the group consisting of C$_4$ to C$_{20}$ bulky alkyl, aralkyl, aryl and substituted aryl groups, said aryl groups being substituted with at least one alkyl, chloro or methoxy group and a hindered cyclic amide group, wherein both R groups are taken together to form said hindered cyclic amide group, and Y is selected from the group consisting of aluminum, gallium and indium; and
    (c) at least one Lewis base which does not cause excessive cleavage of metal-carbon bonds or loss of active sites.

2. The composition of claim 1 wherein said transition metal halide is selected from TiCl$_4$ and TiCl$_3$ and mixtures thereof.

3. The composition of claim 1 wherein said transition metal halide is TiCl$_4$.

4. The composition of claim 1 or 3 wherein said transition metal halide is supported on MgCl$_2$.

5. The composition of claim 1 or 4 wherein said Y is Al.

6. The composition of claim 1 wherein said R groups and said N of said R'$_2$YNR$_2$ are a portion of a hindered cyclic amide structure, said cyclic amide structure being selected from the group consisting of piperidide and pyrrolidide.

7. The composition of claim 6 wherein said hindered cyclic amide is selected from the group consisting of 2,6-diisopropylpiperidide, 2,2,6,6-tetramethylpiperidide, 2,2,5,5-tetramethylpyrrolidide, 2,2,6-trimethylpiperidide and 2,6-diisopropylpyrrolidide.

8. The composition of claim 1 or 3 wherein at least one of said Lewis bases is hindered.

9. The composition of claim 1, 3 or 8 wherein said Lewis base is selected from the group consisting of piperidines, pyrrolidines, ketones, tetrahydrofurans, secondary and tertiary aromatic amines and secondary and tertiary aliphatic amines.

10. The composition of claim 1 or 3 wherein said Lewis base is a hindered piperidine.

11. The composition of claim 1 or 3 wherein said Lewis base is selected from the group consisting of 2,2,6,6-tetramethylpiperidine, 2,2,5,5-tetramethylpyrrolidine, 2,2,5,5-tetramethyltetrahydrofuran, di-tert-butylketone and 2,6-diisopropylpiperidine.

12. The composition of claim 1 or 3 wherein said Lewis base is selected from the group consisting of ortho-tolyl-t-butylketone, methyl 2,6-di-tert-butylphenylketone, diisopropylethylamine, t-butyldimethylamine, and 6-methyl-2-isopropylpyridine.

13. The composition of claim 1 or 3 wherein said Lewis base is selected from the group consisting of diphenylamine, di-ortho-tolylamine, N,N-diethylaniline, di-ortho-tolylketone and phenylnaphthylamine.

14. The composition of claim 1 or 3 wherein said Lewis base is 2,2,6,6-tetramethylpiperidine.

15. The composition of claim 1 or 3 wherein said Lewis base is 2,2,5,5-tetramethylpyrrolidine.

16. The composition of claim 1 or 3 wherein said alkyl metal amide compound is selected from the group consisting of $Et_2AlN\phi_2$, $Et_2AlN(orthotolyl)_2$ and $Et_2AlN\phi 2$-naphthyl.

17. The composition of claim 1 or 3 wherein said alkyl metal amide compound is selected from the group consisting of $Et_2Al$-2,2,5,5-tetramethylpyrrolidide, $Et_2Al$-2,2,6,6-tetramethylpiperidide, $Et_2Al$-2,6-diisopropylpiperidide, and $Et_2Al$-2,5-diisopropylpyrrolidide.

18. The composition of claim 1 or 3 wherein said Lewis base is selected from the group consisting of esters, phosphines, phosphine oxides, alkyl and aryl phosphates, phosphites and hexaalkyl phosphoric triamides and mixtures thereof.

19. The composition of claim 1 or 3 wherein said Lewis base is selected from the group consisting of ethyl benzoate, ethyl p-anisate and methyl p-toluate.

20. The composition of claim 1 or 3 wherein said Lewis base is selected from the group consisting of dimethyl sulfoxide, dimethyl formamide, ethers, epoxides, ketones, saturated and unsaturated heterocycles, cyclic ether and mixtures thereof.

* * * * *